US008285956B2

(12) United States Patent
Ozdemir

(10) Patent No.: US 8,285,956 B2
(45) Date of Patent: Oct. 9, 2012

(54) EFFICIENT LOGGING FOR ASYNCHRONOUSLY REPLICATING VOLUME GROUPS

(75) Inventor: Kadir Ozdemir, San Jose, CA (US)

(73) Assignee: Symantec Corporation, Mountain View, CA (US)

( * ) Notice: Subject to any disclaimer, the term of this patent is extended or adjusted under 35 U.S.C. 154(b) by 364 days.

(21) Appl. No.: 12/603,673

(22) Filed: Oct. 22, 2009

(65) Prior Publication Data

US 2011/0099342 A1  Apr. 28, 2011

(51) Int. Cl.
*G06F 12/02* (2006.01)

(52) U.S. Cl. .......... 711/162; 711/E12.002; 711/E12.103

(58) Field of Classification Search .................. 711/162, 711/E12.002, E12.103
See application file for complete search history.

(56) References Cited

U.S. PATENT DOCUMENTS

| 5,890,154 | A | 3/1999 | Hsiao et al. |
| 6,125,393 | A | 9/2000 | Clark et al. |
| 6,473,776 | B2 | 10/2002 | Ieong et al. |
| 7,076,508 | B2 | 7/2006 | Bourbonnais et al. |
| 7,082,446 | B1 | 7/2006 | Bottomley |
| 7,191,284 | B1 * | 3/2007 | Gupta et al. .................. 711/114 |
| 7,308,545 | B1 * | 12/2007 | Kekre et al. .................. 711/162 |
| 8,055,745 | B2 * | 11/2011 | Atluri ........................... 709/223 |
| 2004/0117584 | A1 * | 6/2004 | Banerjee et al. ............. 711/201 |
| 2007/0162516 | A1 | 7/2007 | Thiel et al. |
| 2010/0250880 | A1 * | 9/2010 | Mimatsu ....................... 711/162 |

* cited by examiner

*Primary Examiner* — Mardochee Chery
(74) *Attorney, Agent, or Firm* — Meyertons Hood Kivlin Kowert & Goetzel, P.C.; Jeffrey C. Hood

(57) ABSTRACT

A system and method for logging for asynchronously replicating volume groups. A write request to write data to a location in a volume may be received. Metadata associated with the write request may be stored. It may be determined if the write request possibly overlaps with one or more earlier write requests to the volume that have not yet been replicated to a secondary storage. The data may be stored in a replication log only if the write request possibly overlaps with one or more earlier write requests to the volume. The data may not be stored in the replication log if the write request does not overlap with one or more earlier write requests to the volume. The data may be written to the location in the volume. Changes to the volume may periodically be replicated to the secondary storage using the replication log.

20 Claims, 9 Drawing Sheets

EFFICIENT LOGGING FOR ASYNCHRONOUSLY REPLICATING VOLUME GROUPS

FIELD OF THE INVENTION

The present invention relates generally to computer systems and more particularly to a system and method for logging and replicating data in volume groups.

DESCRIPTION OF THE RELATED ART

Many business organizations and governmental entities rely upon applications that access large amounts of data, often exceeding many terabytes of data, for mission-critical applications. Numerous different types of storage devices, potentially from multiple storage vendors, with varying functionality, performance and availability characteristics, may be employed in such environments.

Data storage required for applications such as file systems and databases are typically allocated from one or more storage devices that are maintained as a "volume". The "volume" may serve as a logical interface used by an operating system to access data stored on one or more storage media using a single instance of a file system. Thus, a volume may act as an abstraction that essentially "hides" storage allocation and (optionally) data protection/redundancy from the application. An application can store its data on multiple volumes. For example, such multivolume applications may utilize one or more volumes for storing user data and a separate volume for its transaction logging. The set of volumes used by a single application may be referred to as the volume group of the application.

Computer systems, and their components, are subject to various types of failures which may result in the loss of data. For example, a storage device used in or by the computer system may experience a failure (e.g. mechanical, electrical, magnetic, etc.) which may make any data stored on that storage device unreadable. Erroneous software or hardware operation may corrupt the data stored on a storage device, destroying the data stored on an otherwise properly functioning storage device. Any component in the storage chain between (and including) the storage device and the computer system may experience failure (e.g. the storage device, connectors (e.g. cables) between the storage device and other circuitry, the network between the storage device and the accessing computer system (in some cases), etc.).

To mitigate the risk of losing data, computer systems typically replicate (or make backup copies of) data stored on various storage devices. For example, replication is a de-facto technology employed in data centers to protect data against disasters. This is achieved by replicating the volume group of an application to one or more remote locations (referred to as secondary or "replica" sites). To provide for effective disaster recovery, some systems replicate the volume group while it is being changed on the primary site to reduce the lag between the primary site and secondary sites. It is also desirable that the volume group on the secondary site always be consistent with the primary site. This consistency is achieved by applying changes on the volume group on the secondary sites in the same order in which they are applied to the volume group on the primary site.

Changes to data on the primary site may not be applied immediately to the secondary site due to numerous issues including slow network links, failures in the network, failures on the secondary sites, and resource issues on the secondary sites. Since the changes to a secondary site can be delayed indefinitely, the primary site typically maintains a persistent log of changes that have occurred on the primary site. This log is used to apply the changes later whenever the secondary site is ready to accept them.

In some cases replication software at the primary site buffers the changes in memory while also storing them on disk at the primary site. Accordingly, the replication software can obtain the changes directly from memory, and is not required to read the slower on-disk change log. The buffering of data changes in memory is most useful when the pending changes to the secondary site can fit in the available memory on the primary site. The amount of pending changes depends on many factors including the replication network bandwidth and latency, the load on the primary and replica nodes, and the rate of changes on the primary sites. If the data changes will not fit in the available memory on the primary site, a memory buffer overflow results. In this instance, at least some portion of the data changes must be replicated from disk logs.

Typical data replication software implementations operate to record both metadata (changed block addresses) and the data (the content of the changed blocks) on the on-disk log. Although this simplifies the implementation, this methodology doubles the write I/O load on disk as block updates need to be done on both the original volume and the replication log. In order to eliminate disk contention between replication logging and data volume writing, a separate set of disks are typically allocated for logging. In most systems the application data for a write operation must be written to the replication log before the write operation completes. Thus the application write throughput depends on the write throughput of the replication log volume as well as the write throughput of the data volume. However, the size of the log volume is typically much smaller than the data volume. Matching the performance of a small volume to that of a large volume may be a difficult administrative task for some installations, since large volumes likely use more disk devices and therefore enjoy more parallelism than do the smaller replication log volumes.

Therefore, it would be desirable to provide a replication solution that minimizes resource (CPU, memory, disk, and/or I/O bandwidth) overhead to reduce its impact on applications using the primary site.

SUMMARY OF THE INVENTION

Embodiments are presented of a system and method for efficient logging for asynchronously replicating volume groups.

One set of embodiments includes a computer-readable storage medium comprising program instructions and associated method for replicating data. The program instructions/method may be executable to perform the following steps. A write request to write data to a location in a volume may be received. Metadata associated with the write request may be stored. The method may determine if the write request possibly overlaps with one or more earlier write requests to the volume that have not yet been replicated to a secondary storage. The data may be stored in a replication log only in response to determining that the write request possibly overlaps with one or more earlier write requests to the volume. The data may not be stored in the replication log if the write request does not overlap with one or more earlier write requests to the volume. The data may also be written to the location in the volume in response to the write request. Changes to the volume may be periodically replicated to the secondary storage using the replication log.

By only storing data in the replication log when the write request possibly overlaps with one or more earlier write requests to the volume, the method reduces the amount of data stored to the replication log. This provides a more efficient logging mechanism with reduced memory requirements.

In some embodiments, determining if the write request possibly overlaps with one or more earlier write requests to the volume that have not yet been replicated to a secondary storage may include: 1) determining if the write request is the first write request that possibly overlaps on a block range of one or more earlier write requests to the volume and 2) determining that the one or more earlier write requests have not yet been replicated to the secondary storage. In some embodiments, the method may store data from the volume corresponding to the block range to the replication log in response to determining that the write request is the first write request that possibly overlaps on the block range.

In some embodiments, the method may store linking information, wherein the linking information links an entry in the replication log comprising the data from the volume corresponding to the block range and one or more entries in the replication log corresponding to one or more overlapping earlier write requests.

In some embodiments, the method may further maintain a data change map data structure in memory. The method may examine the data change map data structure in determining if the write request possibly overlaps with one or more earlier write requests to the volume that have not yet been replicated to the secondary storage.

In some embodiments, the data change map data structure may include a plurality of entries. The plurality of entries may track locations of changes to the volume that have not yet been replicated to a secondary storage. In some embodiments, maintenance of the data change map data structure may comprise merging entries in the data change map data structure.

In some embodiments, in periodically replicating changes to the volume to the secondary storage using the replication log, the program instructions/method may be executable to perform the following steps. A first record may be read from the replication log. The first record may refer to a first area of the volume. It may be determined if at least a portion of the first area of the volume has been overwritten. If at least a portion of the first area of the volume has not been overwritten, then first data may be read from the portion of the first area of the volume that has not been overwritten and the first data may be provided to the secondary storage. If at least a portion of the first area of the volume has been overwritten, then second data corresponding to the overwritten portion of the first area of the volume may be read from the replication log and the second data may be provided to the secondary storage.

In some embodiments, in determining if at least a portion of the first area of the volume has been overwritten, the program instructions may be executable to utilize information in one or more data structures to determine if at least a portion of the first area of the volume has possibly been overwritten and to determine one or more portions of the replication log that comprise the second data.

In a further set of embodiments, a system for replicating data is contemplated. The system may include one or more processors and a computer readable storage medium. The computer readable storage medium may include program instructions executable by the one or more processors to perform the operations described above.

The replication solution described herein thus provides a more compact and efficient logging mechanism to store changed block information on disk. The replication solution may use a novel adaptive data change map in-memory data structure to keep track of changed blocks using reduced memory.

Figure 1:
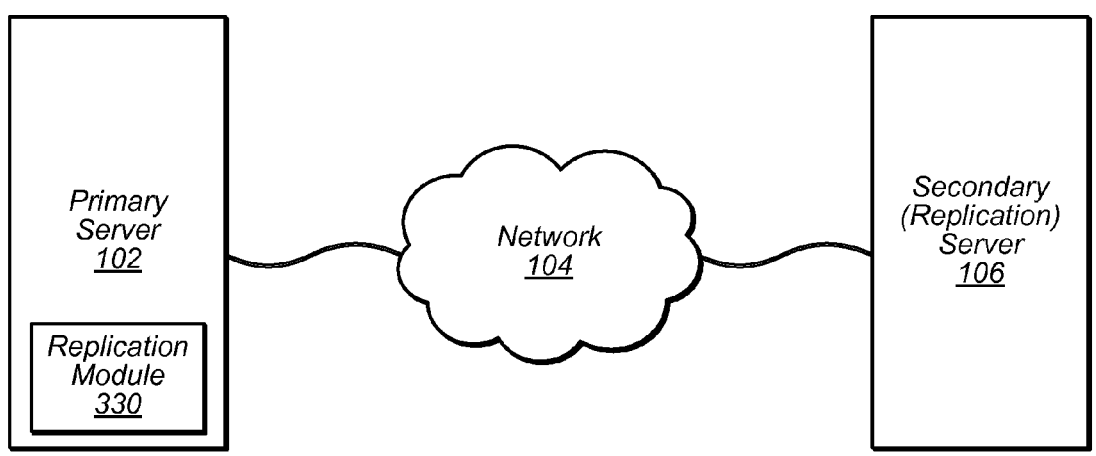
FIG. 1 illustrates servers connected over a network according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Computer System." This term has its ordinary and accepted meaning in the art. In general, the term "computer system" can be broadly defined to encompass any device (or combination of devices) having at least one processor that executes instructions from a memory medium. The term "computer system" includes one or more computer systems (or computing devices) operating together and any software stored thereon.

"Storage Medium." This term has its ordinary and accepted meaning in the art, and includes any of various types of memory/storage. The term "storage medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The storage medium may comprise other types of memory as well, or combinations thereof. In addition, the storage medium may be located in a first computer in which the programs are executed, and/or may be located in a second different computer which connects to the first computer over a network, such as the Internet. In the latter instance, the second computer may provide program instructions to the first computer for execution. The term "storage medium" may include two or more storage media which may reside in different locations, e.g., in different computers that are connected over a network.

"Storage Device." This term has its ordinary and accepted meaning in the art, which includes a device comprising a Storage Medium that stores data generated by a computer system.

"Logging." This term refers broadly to the insertion of information into a log (which is used broadly to refer to a set of information being stored, e.g., in a data structure or dedicated memory). For example, a device may log write operations as they are performed by storing information about the write operations to a predetermined location.

FIG. 1—Servers Connected Over a Network

FIG. 1 is a block diagram illustrating servers connected over a network. As shown, there may be a primary server 102 connected to a secondary (replication) server 106 over a network 104. The network 104 may be any of various types of networks, for example, local area network (LAN), a storage area network (SAN), or a wide area network (WAN). The network connection may be wired or wireless. There may also be other systems (e.g. computer systems) and/or devices also connected over the network 104; alternatively, there may only be the primary server 102 and the secondary (replication) server 106. One or both of servers 102, 106 may additionally be coupled to one or more other systems and/or devices; for example, in some embodiments, each server may be coupled (e.g., directly, through network 104, and/or by a different indirect means) to one or more storage devices, such as disk drives or tape drives.

As shown, primary server 102 may include a replication module 330. The replication module 330 may be adapted to implement embodiments of the present disclosure, e.g., to efficiently log and asynchronously replicate changes to a volume group.

While the detailed description below may refer to embodiments using servers, such as those shown in FIG. 1 and described herein, it should be noted that embodiments of the system and method described herein may be performed with any computer systems, and may not be limited to server computer systems.

Figure 2:
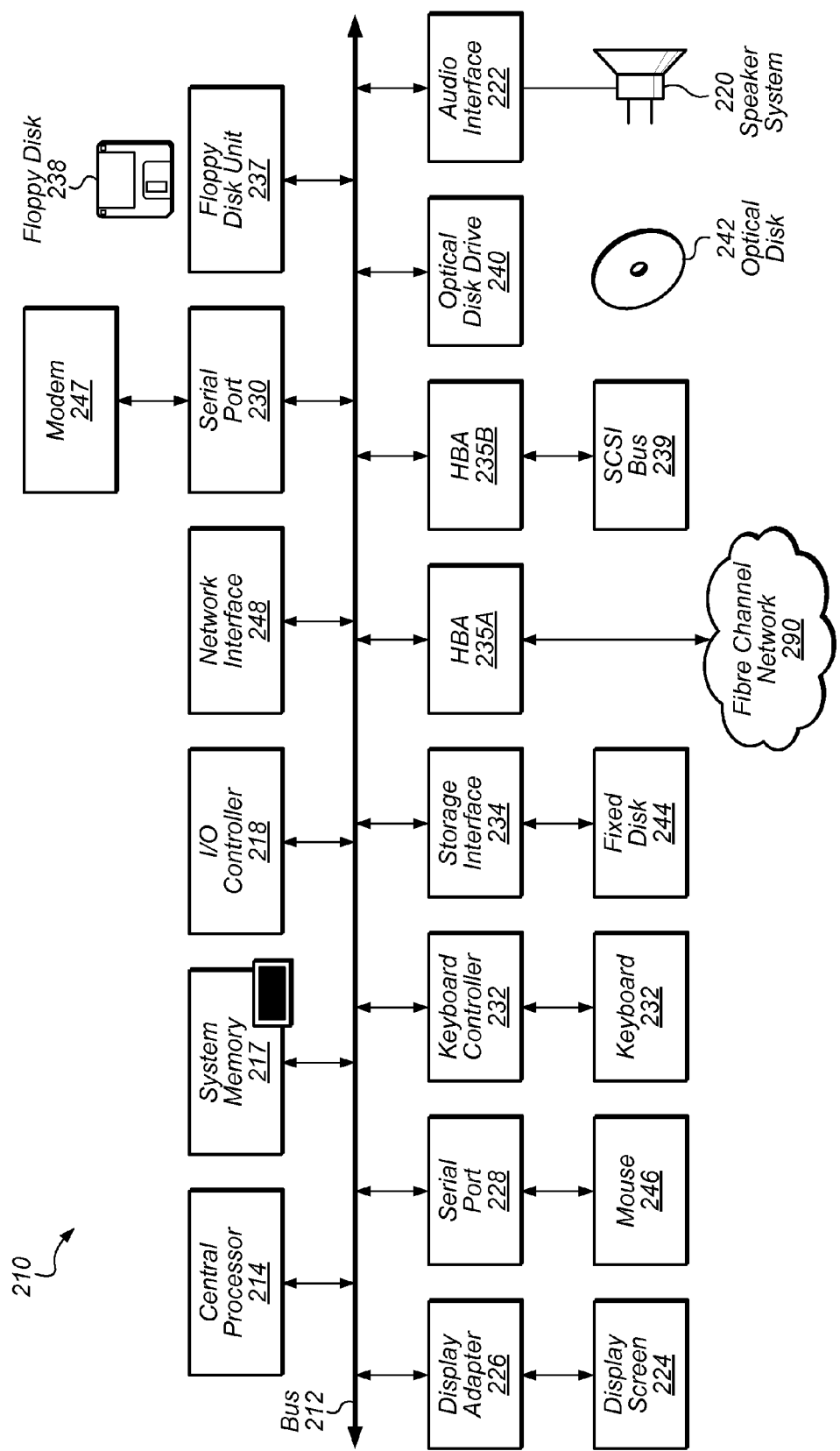
FIG. 2 is an exemplary block diagram illustrating a computer system according to one embodiment.

FIG. 2—Exemplary Computer System Block Diagram

FIG. 2 depicts a block diagram of a computer system 210 suitable for implementing the present disclosure. For example, primary server 102 and/or secondary server 106 shown in FIG. 1 could be implemented as computer system 210 according to some embodiments. Computer system 210 includes a bus 212 which interconnects major subsystems of computer system 210, such as a central processor 214, a system memory 217 (typically RAM, but which may also include ROM, flash RAM, or the like), an input/output controller 218, an external audio device, such as a speaker system 220 via an audio output interface 222, an external device, such as a display screen 224 via display adapter 226, serial ports 228 and 230, a keyboard 232 (interfaced with a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included are a mouse 246 (or other point-and-click device, coupled to bus 212 via serial port 228), a modem 247 (coupled to bus 212 via serial port 230), and a network interface 248 (coupled directly to bus 212).

Bus 212 allows data communication between central processor 214 and system memory 217, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 210 are generally stored on and accessed via a computer readable medium, such as a hard disk drive (e.g., fixed disk 244), an optical drive (e.g., optical drive 240), a floppy disk unit 237, or other storage medium. Additionally, applications can be in the form of electronic signals modulated in accordance with the application and data communication technology when accessed via network modem 247 or interface 248.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. The operation of a computer system such as that shown in FIG. 2 is readily known in the art and is not discussed in detail in this application. Code to implement the present disclosure can be stored in computer-readable storage media such as one or more of system memory 217, fixed disk 244, optical disk 242, or floppy disk 238. The operating system provided on computer system 210 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 3:
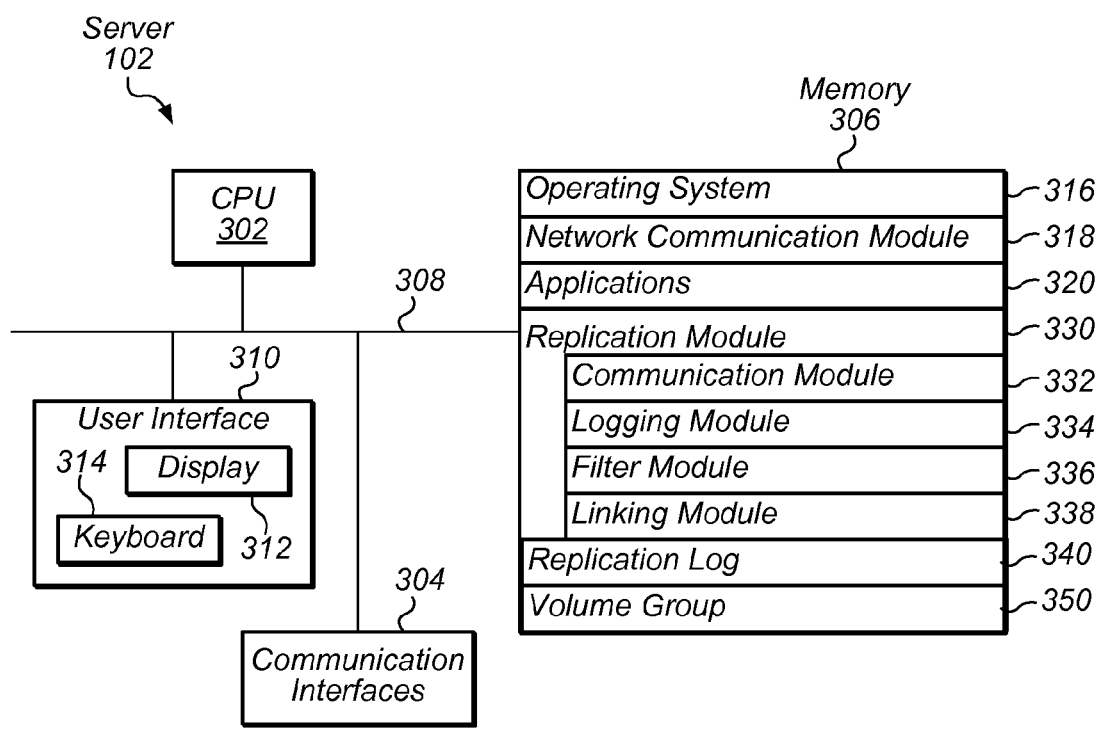
FIG. 3 illustrates an exemplary software architecture according to one embodiment.

FIG. 3—Exemplary Server

FIG. 3 illustrates an exemplary server adapted to implement the present disclosure according to one embodiment. The server 102 may include one or more processing units (CPUs) 302, one or more network or other communications interfaces 304, memory 306, and one or more communication buses 308 for interconnecting these components. The server 102 may include a user interface 310, including a display 312 and a keyboard 314. The memory 306 may include high speed random access memory and may also include non-volatile memory, such as one or more magnetic or optical storage disks. The memory 306 may include mass storage that is remotely located from CPUs 302. The memory 306 may store the following elements, or a subset or superset of such elements:

an operating system 316 that includes procedures for handling various basic system services and for performing hardware dependent tasks;

a network communication module (or instructions) 318 that is used for connecting the server to other computers via the one or more communications interfaces 304 (wired or wireless), such as the Internet, other wide area networks, local area networks, metropolitan area networks, and so on;

applications 320, which may include one or more of e-mail, word processing, spreadsheet, and other office productivity applications, specialized applications for handling graphics, images, audio files, video files, performing numeric calculations and the like, and/or any of numerous other software applications;

a replication module 330 for logging and asynchronously replicating changes to a volume group;

a replication log 340; and a volume group 350, which may include one or more volumes.

It should be noted that one or both of the replication log 340 and the volume group 350 may not be located on the server 102; for example, the replication log 340 and the volume group 350 may be located on one or more storage devices, such as one or more disk or tape drives, e.g., in a disk library and/or tape library, which may be coupled (directly or indirectly) to the server 102.

In some embodiments, the replication module 330 includes the following elements, or a subset or superset of such elements:

a communication module 332 for receiving and transmitting information;

a logging module 334 for creating, modifying, and/or deleting log records;

a filter module 336 for tracking portions of volumes that have been modified and not duplicated; and a linking module 338 for linking log records that refer to volume portions that have been modified multiple times and not duplicated.

It will be noted that in various embodiments, one or more modules and/or submodules can be combined together or separated in further modules, as desired.

FIG. 4A—Flowchart

Figure 4A:
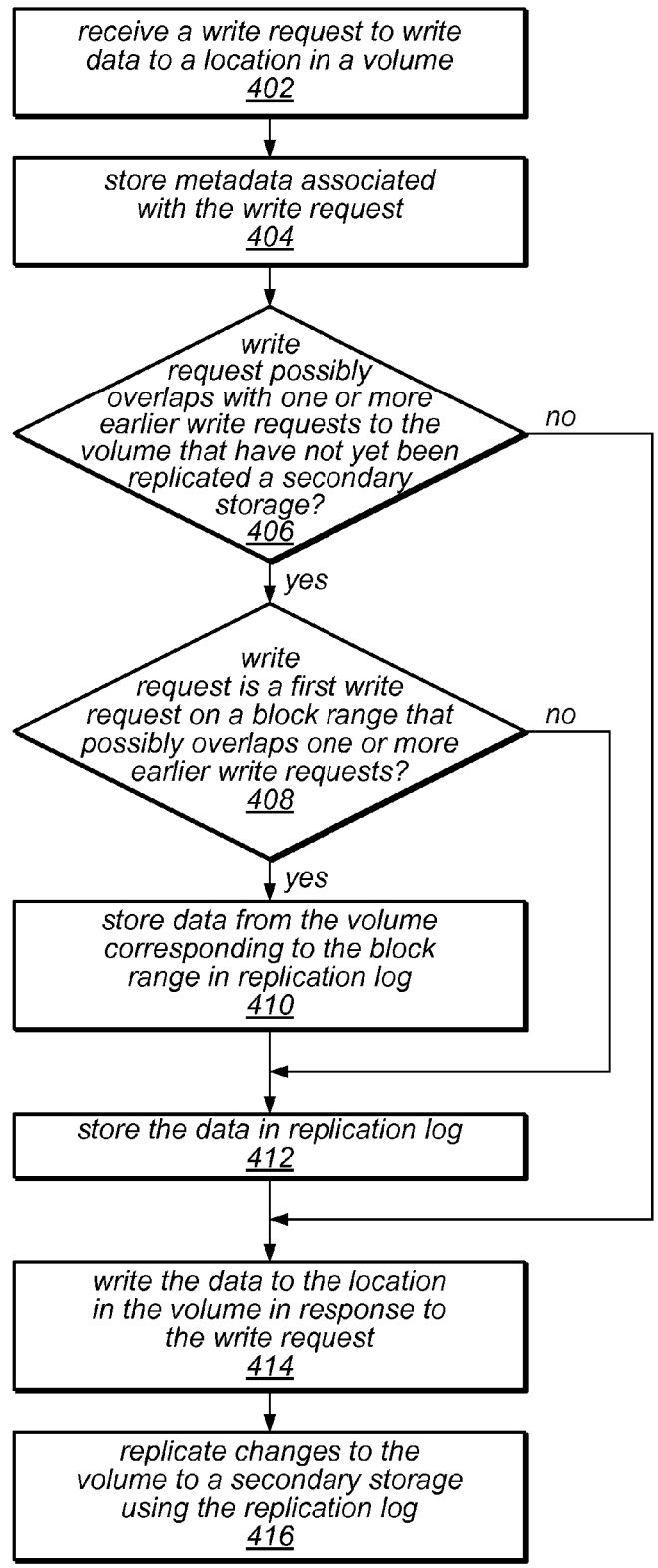
FIGS. 4A-4B are flowchart diagrams illustrating operation of an exemplary embodiment.

FIG. 4A is a flowchart diagram illustrating a method for logging and asynchronously replicating changes to a volume group according to one embodiment. Asynchronous replication typically relies on logging changes made to a first volume group (the "primary" or "primary storage") in between opportunities to replicate those changes to a second (e.g., remote) volume group (known as "secondary storage"). Whereas typical logging solutions for asynchronous replication to secondary storage may log application write data in a replication log for each write operation, the present disclosure may involve performing data logging only when a write request overlaps with an earlier write request which has not been replicated yet. This is possible because if data from a write operation has not been overwritten, when replication is performed, the data for that write operation may be replicated directly from the volume. The method may thus save log space dramatically when the number of writes that overlap with pending writes to secondary storage is much less than the number of non-overlapping writes. This is indeed expected to be the case for most applications. Thus, the solution may improve the performance for writes by reducing I/O bandwidth and processing by not writing the data twice (e.g., to the volume and to the replication log) most of the time.

The method may be implemented by a computer system (e.g., server 102 shown in various of the previous Figures, or another computer system). The computer system may include, for example, one or more processors, and a computer readable storage medium which stores program instructions executable by the one or more processors to perform the method. The computer system may also include other hardware and/or components, for example, any of the hardware and components shown in and described with respect to FIG. 2. In some embodiments, the method may be implemented by the replication module 330, e.g., including various sub-modules such as those shown in FIG. 3, executing on server computer system 102. One embodiment includes a computer readable storage medium (e.g., an article of manufacture) which stores program instructions executable to implement a method according to the embodiments described herein.

It should be noted that although the description below may set forth steps as being performed in a particular order, various of the steps may be performed in a different order, repeated, or omitted, as desired. One or more additional steps may also be performed, in some embodiments. The method may be performed as described below.

In 402, a write request to write data to a location in a volume may be received. In some embodiments, the write request may be received by communication module 332 of replication module 330. The write request may be received from an application. The application may be any type of application; for example, in some embodiments the application may be one of the applications 320 on the server 102 shown in FIG. 3. In addition, the application may be executing locally or remotely; for example, the application may be located on the computer system implementing the method (e.g., executing on one or more shared processors) or may be located on a different computer system. In other words, the write request may be received from within the computer system implementing the method, or externally, e.g., through a network.

The volume to which the write request is to be performed may be part of a volume group. For example, the application from which the write request is received may be associated with a particular volume group in which the application stores data. The volume may thus be a part of a volume group including multiple volumes. Alternatively, the volume may be an individual volume, and/or the volume may form its own individual volume group. A replica of the volume (e.g., individually or as part of a volume group) may be maintained at a secondary storage, e.g., at a remote location, for backup or other purposes.

In 404, metadata associated with the write request may be stored. The metadata may be stored by logging module 334 of replication module 330. In some embodiments, the metadata may include information indicating the location in the volume to which the data of the write request is to be written. For example, in some embodiments, the metadata may include an offset value (e.g., indicating a starting location in the volume) and a length value (e.g., indicating how much data is to be written). Other metadata formats are also contemplated.

The metadata may be stored in a log record. In some embodiments, the metadata may be stored in its own metadata log. Alternatively, the metadata may be stored in a replication log which may include both metadata and data, if desired.

In 406, it may be determined whether the write request possibly overlaps with one or more earlier write requests to the volume that have not yet been replicated to a secondary storage. This step may be performed by filter module 336 of replication module 330. As noted above, many of the benefits of the method may accrue from only logging data which overlaps with previous writes that have not yet been replicated. Thus, it may be important to track which portions of the volume have been changed since the volume was last replicated to a secondary storage.

In some embodiments, the filter module may include a data structure that may be used to track which portions of the volume have been changed since the volume was last replicated to a secondary storage. Determining whether the write request possibly overlaps with one or more earlier write requests to the volume that have not yet been replicated to a secondary storage may include examining this data structure, in some embodiments. This data structure may be referred to herein as a "data change map" data structure. The data change map data structure may take any number of forms, according to various embodiments; for example, in some embodiments, the data change map data structure may be a bitmap, e.g., in which each bit represents an area of the volume, where for each portion of the volume that is written, the bit representing the area of the volume in which that portion resides may be marked as having been written. In other embodiments, the data change map data structure may be a hash or skip list, a balanced tree, or any of various other possible data structures, as desired.

In some embodiments, the data structure may include one or more entries for tracking locations of changes to the volume. For example, each entry may indicate a location in the volume which has been written. In some embodiments, the data structure may be adaptive, and may track changes to the volume approximately. In this case, typically at least part of each entry may indicate a location in the volume which has been written, although part(s) of the location indicated by an entry may be marked as having possibly been written to even if they have not been written to since changes to the volume were last replicated to the secondary storage. In some such embodiments, entries in the data change map may be merged, e.g., in order to keep the data change map from becoming excessively large. Utilizing an adaptive (e.g., compressible) data change map may be particularly desirable in some embodiments, e.g., if the data change map is stored in-memory, because the memory available for the data structure may be limited in such cases. An exemplary implementation of such an adaptive data change map according to one embodiment is described in further detail below with respect to FIGS. 7A-7B. It should be noted that although an adaptive data change map may in some embodiments be inexact in that in some cases areas may be marked as having possibly been changed even if they have not been changed, the adaptive data change map may not mark areas which have been changed as unchanged, and thus may always be exact in this regard.

If it is determined that the write request does not overlap with any earlier write requests (e.g., that the location to which the data of the write request is to be written does not overlap with locations of write requests which have been written earlier, but whose content has not yet been replicated to secondary storage), then data for the write request may not be logged. In other words, in such cases a metadata only log record (e.g., including the metadata stored in step 404) may be created, and the method may proceed to step 414, as described below. However, if it is determined that the write request may possibly overlap with one or more earlier write requests, the method may proceed to step 408.

In 408, it may be determined if the write request is a first write request on a block range that possibly overlaps with one or more earlier write requests. In some embodiments, this step may be performed by linking module 338 of replication module 330. In some embodiments, a different logging procedure may be performed depending on whether a write request is a first write request to overlap with one or more earlier write requests on a given block range. As noted above, if a write request does not overlap with any other write requests, the data for that write request may not be logged. Thus, if a subsequent write request overlaps an area of the volume that has been written to but not logged, the data may need to be read from the volume (e.g., a copy-on-write operation) and logged before the subsequent write request can be performed. Additionally, in some embodiments, if a write request is a first overlapping write request, the data for the write request itself may also be logged, so that in further subsequent write requests, only the write request data may need to be logged. Thus, in such embodiments, it may be important to be able to distinguish between a first overlapping write to an area of the volume and subsequent overlapping writes to an area of the volume.

This function may be filled in any of a variety of ways. According to some embodiments, there may be a data structure in which information is recorded indicating if an overlapping write has been made to an area of the volume. The information in the data structure may also serve other functions; for example, some embodiments are contemplated in which the data structure may be used to link log records in which copy-on-write data (e.g., data logged from the volume because of an impending overlapping write operation) is stored to metadata-only log records which refer to corresponding areas of the volume. An exemplary implementation of such a linking data structure according to one embodiment (e.g., the b-tree data structure 720 of FIGS. 7A-7B) is described in further detail below with respect to FIGS. 7A-7B.

If it is determined that the write request is the first write request on a block range that possibly overlaps with one or more earlier write requests, the data on that block range from the volume may need to logged, and thus the method may proceed to step 410. In contrast, if it is determined that the write request is not the first write request on a block range that possibly overlaps with one or more earlier write requests, no data from the volume may need to logged (e.g., any data from previous writes on the block range may already be logged), and the method may proceed to step 412.

In 410, data from the volume corresponding to the block range may be stored in the replication log. This step may be performed by the logging module 334 of replication module 330. As noted above, one significant advantage of the method described herein may be that writes to the volume which are not overwritten before they are replicated may not need to be logged. However, since for write operations that are the first write operations to an area of the volume, no data may be logged (e.g., the log entry for such writes may be a metadata only entry), subsequent (e.g., overlapping) write operations may need to log data from the volume before the overlapping write operations can occur; otherwise, there would be no record of the overwritten data from which to reproduce the corresponding write operation during replication to secondary storage. Thus, if it is determined that the write request is the first write request on a block range that possibly overlaps with one or more earlier write requests, data from the volume corresponding to the block range may be stored in the replication log.

Depending on the structure of the replication log, in some embodiments additional information (e.g., additional metadata) may also be stored. For example, as noted above with respect to step 408, some embodiments may utilize a linking data structure to indicate if an overlapping write has been made to an area of the volume; such a data structure may help serve to link entries in the replication log. In some embodiments, linking information may be stored in such a linking data structure, or may be stored in the replication log (e.g., with one or more entries to be linked), or both. Other manners of storing linking information are also contemplated. An exemplary implementation of how such linking information (e.g., b-tree node information in the b-tree data structure 720 and/or b-tree nodes 732 in FIGS. 7A-7B) may be used according to one embodiment is described in further detail below with respect to FIGS. 7A-7B.

In 412, the data from the write request may be stored in the replication log. This step may be performed by the logging module 334 of replication module 330. As noted above, this step may only be performed if the write request possibly overlaps with one or more earlier write requests to the volume. The data may be stored in a data section of a log record which also contains metadata (e.g., from step 404), or may be stored separately from the metadata, e.g., in a separate data log, as desired.

In 414, the data from the write request may be written to the location in the volume in response to the write request. Writing the data to the volume may be performed by communication module 332 of replication module 330. Once metadata and the data from the write request have been logged (e.g., if it is an overlapping write), or simply once metadata has been stored for the write request (e.g., if it is not an overlapping write), the write may be performed on the volume.

In 416, changes to the volume may be replicated to a secondary storage using the replication log. Replication may be a periodic event, e.g., may occur at regular or irregular intervals, and may not occur immediately as changes are made to the volume. In other words, the replication may be an asynchronous replication. The replication log may be used to replicate the changes that have been made to the volume to the secondary storage; for example, metadata and data from various log records may be used to perform the same write operations on a corresponding volume in the secondary storage as were performed on the primary volume. Furthermore, in some embodiments, a write order (or an equivalent write order) may be used in replicating changes; for example, for a given location of the volume, write operations may be replicated in the same order as they were performed on the primary volume. It should be noted that this may not necessarily require that every write performed on the primary volume be replicated to the secondary storage in the identical order, but rather may only require that the order of write operations for any given location in the volume be maintained. When applications submit multiple write requests, the storage subsystem may be allowed to process them in any order. Similarly, the order in which a set of outstanding writes are written to the primary storage can be different than the order in which they are written to the secondary storage.

Further detail with respect to replication of changes to secondary storage, as to how this step may be implemented according to some embodiments, is shown in and provided below with respect to FIG. 4B.

FIG. 4B—Flowchart

Figure 4B:
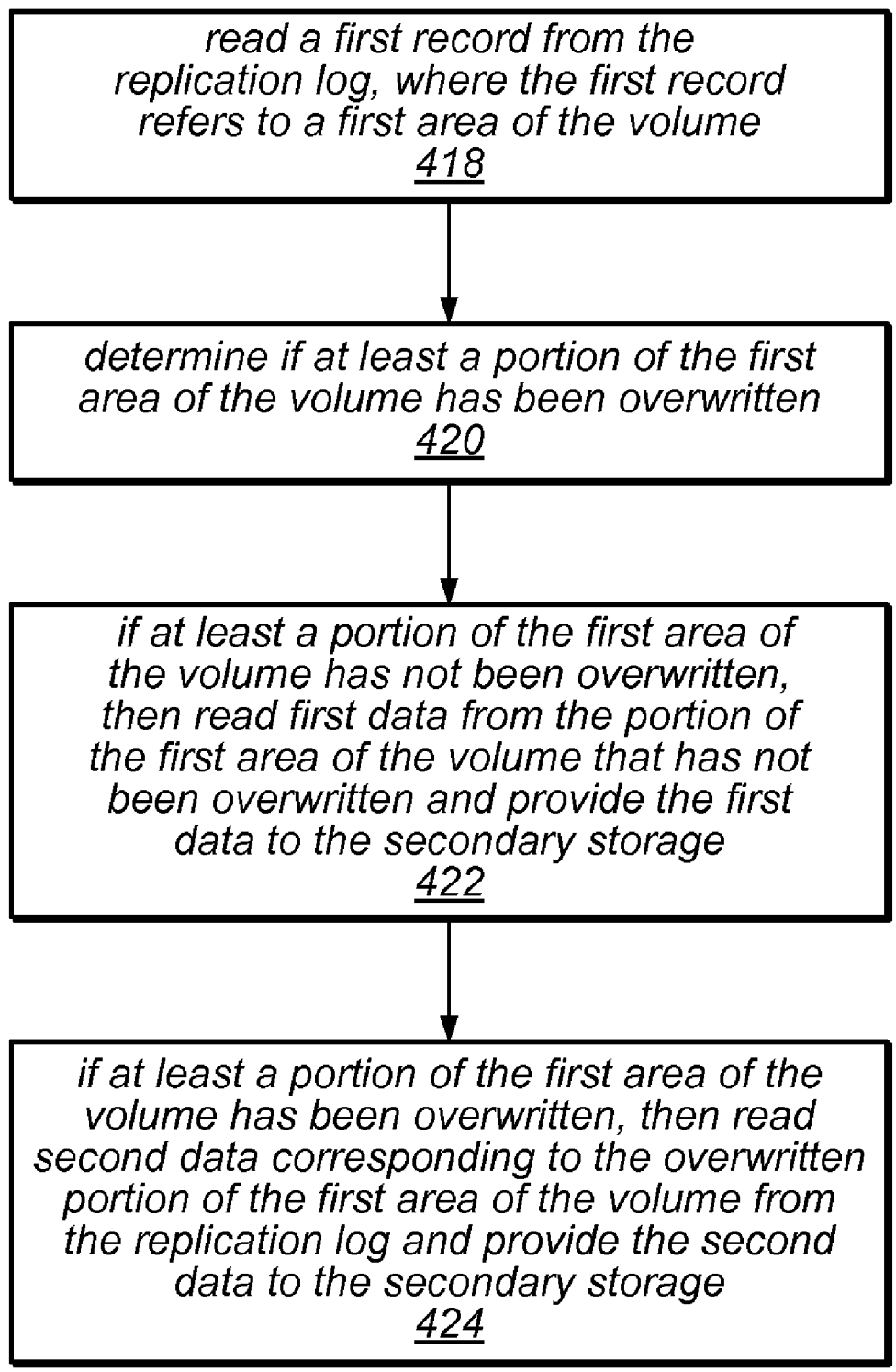

FIG. 4B is a flowchart diagram illustrating further detail of step 416 shown in FIG. 4A, showing an exemplary implementation of how changes to a volume may be replicated to a secondary storage using the replication log. As with FIG. 4A, it should be noted that although the description below may set forth steps as being performed in a particular order, various of the steps may be performed in a different order, repeated, or omitted, as desired. One or more additional steps may also be performed, in some embodiments. The method may be performed as described below.

In 418, a first record from the replication log may be read. The first record may refer to a first area of the volume. For example, the first record may indicate that a write operation to the first area of the volume has been performed since changes to the volume were last replicated. In some embodiments, this step may be performed by communication module 332 of replication module 330. The first record may include metadata only, or may include metadata and data.

In 420, it may be determined if at least a portion of the first area of the volume has been overwritten. According to various embodiments, this step may be implemented in a variety of ways. For example, if the first record includes both metadata and data, it may be an indication that the first area of the volume has been overwritten. If the first record is a metadata only entry, the determination may require one or both of filter module 336 and linking module 338 of replication module 330. In some embodiments, if the first record is a metadata only record, the data change map may be examined first. If the data change map indicates that part or all of the first area of the volume has not been overwritten, this may indicate that the part of the first area of the volume that has not been overwritten may accurately reflect the data of the write operation indicated by the first record for that part of the first area. If the data change map indicates that part or all of the first area of the volume may have been overwritten, an examination of the linking data structure may be made. The linking data structure may indicate if any portions of the first area have been overwritten, and for each portion that has been overwritten, the linking data structure may indicate one or more other records in the replication log which contain data corresponding to the write operation to which the first record refers. It should be noted that since the data change map data structure may be approximate, it is possible that the data change map may indicate that part or all of the first area of the volume may have been overwritten, even if that part has not been overwritten. However, since the linking structure may not include any indication that this part has been overwritten, there should be no problem determining whether each portion of the first area of the volume has or has not been overwritten.

In 422, if at least a portion of the first area of the volume has not been overwritten, then first data may be read from the portion of the first area of the volume that has not been overwritten and provided to the secondary storage. In other words, if the first record refers to a write operation that did not overwrite any earlier write operations that had not been replicated to the secondary storage, and at least part of the data written in the write operation referred to by the first record has not since been overwritten, that part of the data may be read directly from the volume.

In 424, if at least a portion of the first area of the volume has been overwritten, then second data corresponding to the overwritten portion of the first area of the volume may be read from the replication log and provided to the secondary storage. Depending on whether the first record refers to a write operation that possibly overwrote one or more earlier write operations that had not been replicated to the secondary storage, or to a write operation that did not overwrite any earlier write operations that had not been replicated to the secondary storage, the second data may be stored in the first record in the replication log (e.g., in the former case), or in one or more other records in the replication log (e.g., in the latter case). In the latter case, the one or more other records from which the second data may be read may be indicated by the linking data structure, as described above with respect to step 420.

The above steps may be performed for each record in the replication log, thereby replicating to the secondary storage all of the write operations that had occurred on the primary volume since a most recent replication operation. Once the replication has been performed, the replication log may be flushed (e.g., all records may be discarded), as may be any of the various data structures used (e.g., the data change map and/or the linking data structure) according to the various embodiments. Thus, after a replication operation, the method may be performed again, in order to log changes until a next replication operation may be performed.

Figure 5:
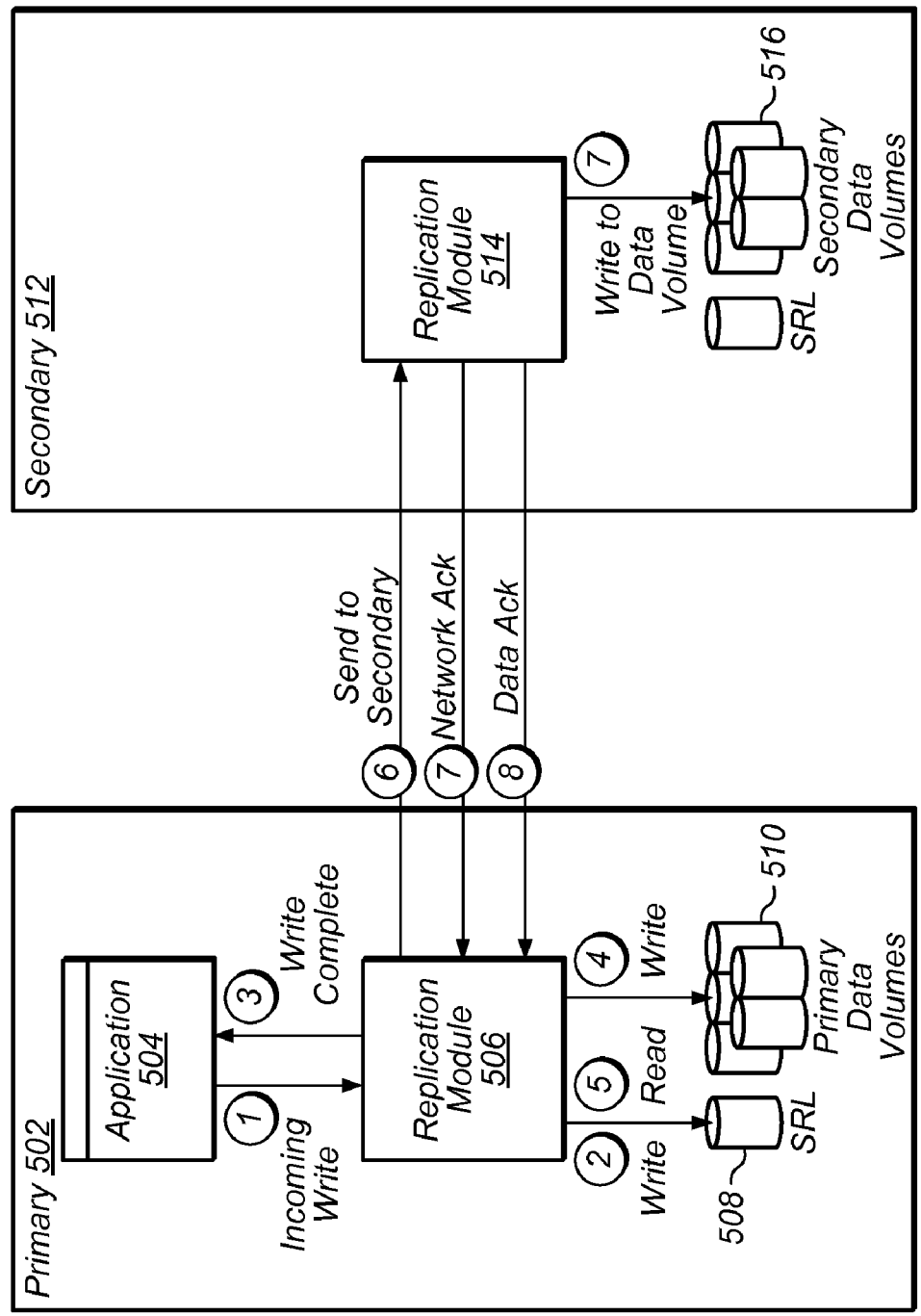
FIGS. 5-6 are diagrams illustrating methods for logging and asynchronously replicating changes to a volume group according to various embodiments.
Figure 6:
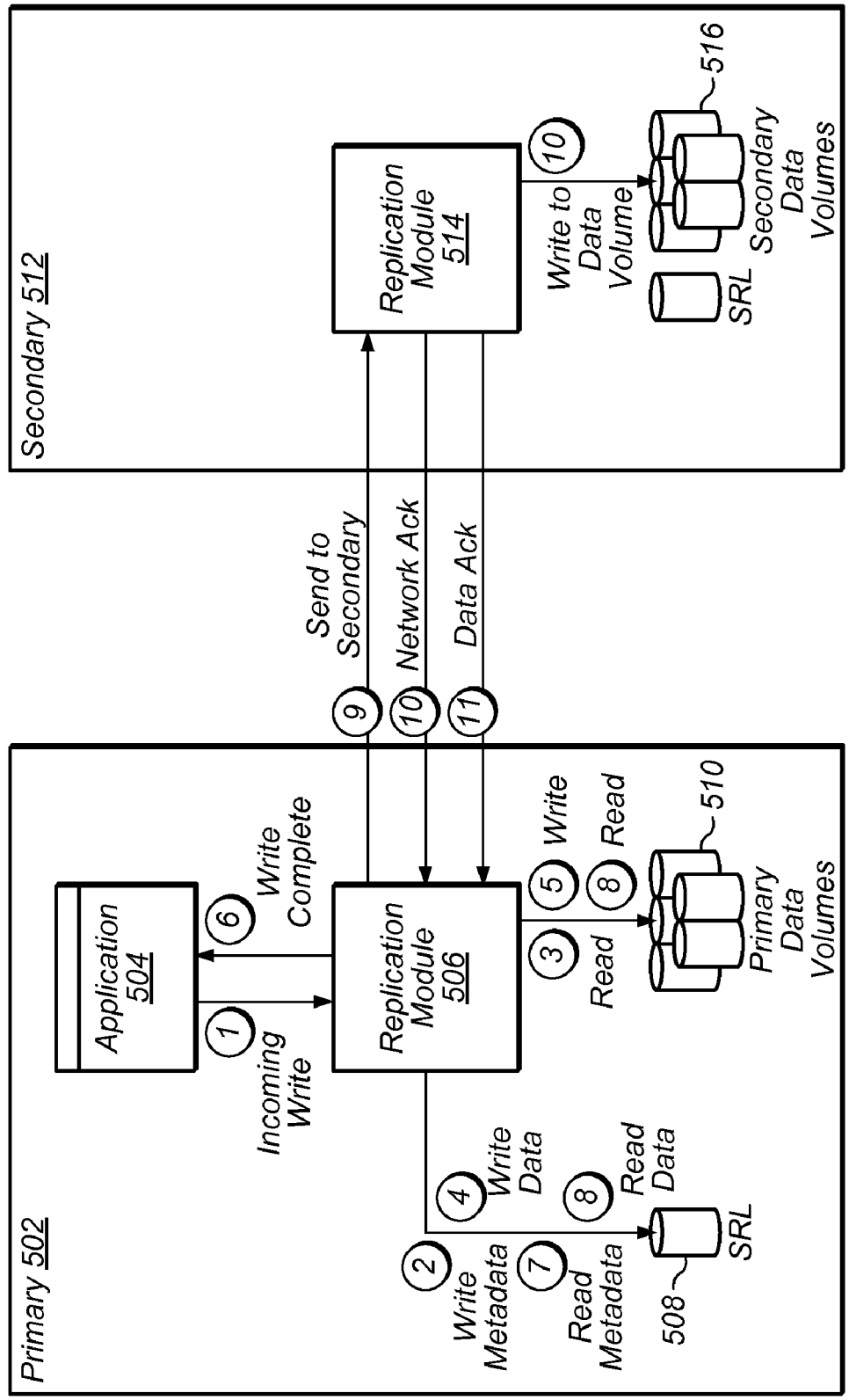

FIGS. 5-6—Diagrams Illustrating Methods for Logging and Asynchronously Replicating Changes to a Volume Group FIGS. 5 and 6 are diagrams illustrating methods for logging and asynchronously replicating changes to a volume group according to various embodiments. It should be noted that FIGS. 5 and 6 are provided as exemplary implementations of such methods, and do not represent all possible embodiments. Accordingly, limitations shown in FIGS. 5 and 6 and described herein with respect thereto should not be read as limiting to the disclosure as a whole.

As shown, both methods may be implemented by a replication module 506 at a primary site 502. The replication module may act to write application data from an application 504 at the primary site 502 to a volume (e.g., in primary data volumes 510) at the primary site. Both methods also involve performing logging (e.g., to a storage replicator log (SRL) 508) for the application data writes, and periodically replicating application data writes to a secondary site 512. In replicating the application data writes, the replication module 506 at the primary site may convey the application data writes to a replication module 514 at the secondary site 512, and the replication module 514 may write the application data to a volume (e.g., in secondary data volumes 516) at the secondary site.

However, the methods of FIG. 5 and FIG. 6 may differ in the way logging is performed, and as a result, the manner in which replication is performed may also differ between the methods. More specifically, the procedure shown in FIG. 5 may involve, for a write request received from application 504, always both logging the data of the write request and writing the data of the write request to the volume. In contrast, the procedure shown in FIG. 6 may involve, for a write request received from application 504, always writing the data of the write request to the volume, but only logging the data of the write request if the write request possibly overlaps with one or more earlier write operations that have occurred since a most recent replication operation.

The logging aspect of the method of FIG. 5 may first involve the replication module 506 receiving a write request from application 504. The replication module 506 may then perform the write to the SRL 508, and send an acknowledgement to the application 504 that the write is complete, and perform the write to the primary data volumes 510.

The logging aspect of the method of FIG. 6 may also first involve the replication module 506 receiving a write request from application 504. However, in contrast to the method of FIG. 5, the method of FIG. 6 may then store metadata for the write request to the SRL 508, and determine if the write request will overlap a range on the volume that has been written to but not yet replicated. If the write request will not overlap a range on the volume that has been written to but not yet replicated, the record for the write request in the SRL 508 may simply be the metadata already stored. If the write request will overlap a range on the volume that has been written to but not yet replicated, and it is the first overlapping write request on the range, the replication module 506 may read data from the primary data volumes 510 for the first-time overlapping range and write that data to the SRL 508. The replication module 506 may then write the data of the write request to the SRL 508. If the write request will overlap a range on the volume that has been written to but not yet replicated, but it is not the first overlapping write request on the range, the replication module 506 may simply write the data of the write request to the SRL 508. The replication module 506 may then perform the write to the primary data volumes 510, and send an acknowledgement to the application 504 that the write is complete.

The replication aspect of the method of FIG. 5 may simply involve the replication module 506 reading the log records of application data writes and sending the writes to replication module 514 at the secondary site, which may perform the writes, in the order in which the writes were received on the primary, to the secondary data volumes 516. The replication module 514 may send a network acknowledgement to the replication module 506 indicating that each write instruction has been received to a memory buffer of replication module 514, and after the replication module 514 has performed each write operation to the secondary data volumes 516, the replication module 514 may also send a data acknowledgment to the replication module 506 at the primary site. The replication module 506 may also, upon receiving a data acknowledgement, mark the corresponding write operation as having been completed in the SRL 508.

The replication aspect of the method of FIG. 6 may first involve the replication module 506 reading metadata for a write operation from the SRL 508. Based on the metadata (e.g., based on whether the data for the write operation is in the SRL 508, in the primary data volumes 510, or a combination thereof), the replication module 506 may then read the application write data from the SRL 508, the primary data volumes 510, or a combination thereof. The replication module 506 may then send the application data writes to replication module 514 at the secondary site, which may perform the writes, in the order in which the writes were received on the primary, to the secondary data volumes 516. The replication module 514 may send a network acknowledgement to the replication module 506 indicating that each write instruction has been received to a memory buffer of replication module 514, and after the replication module 514 has performed each write operation to the secondary data volumes 516, the replication module 514 may also send a data acknowledgment to the replication module 506 at the primary site. The replication module 506 may also, upon receiving a data acknowledgement, mark the corresponding write operation as having been completed in the SRL 508.

Thus, while the method of FIG. 5 may be slightly more straightforward to implement, it involves logging application data for every application write request. This means every write request must effectively be performed twice. In contrast, while the method of FIG. 6 may be slightly more complex in implementation, it may significantly reducing I/O bandwidth and processing by eliminating double writes for non-overlapping write operations.

Figure 7A:
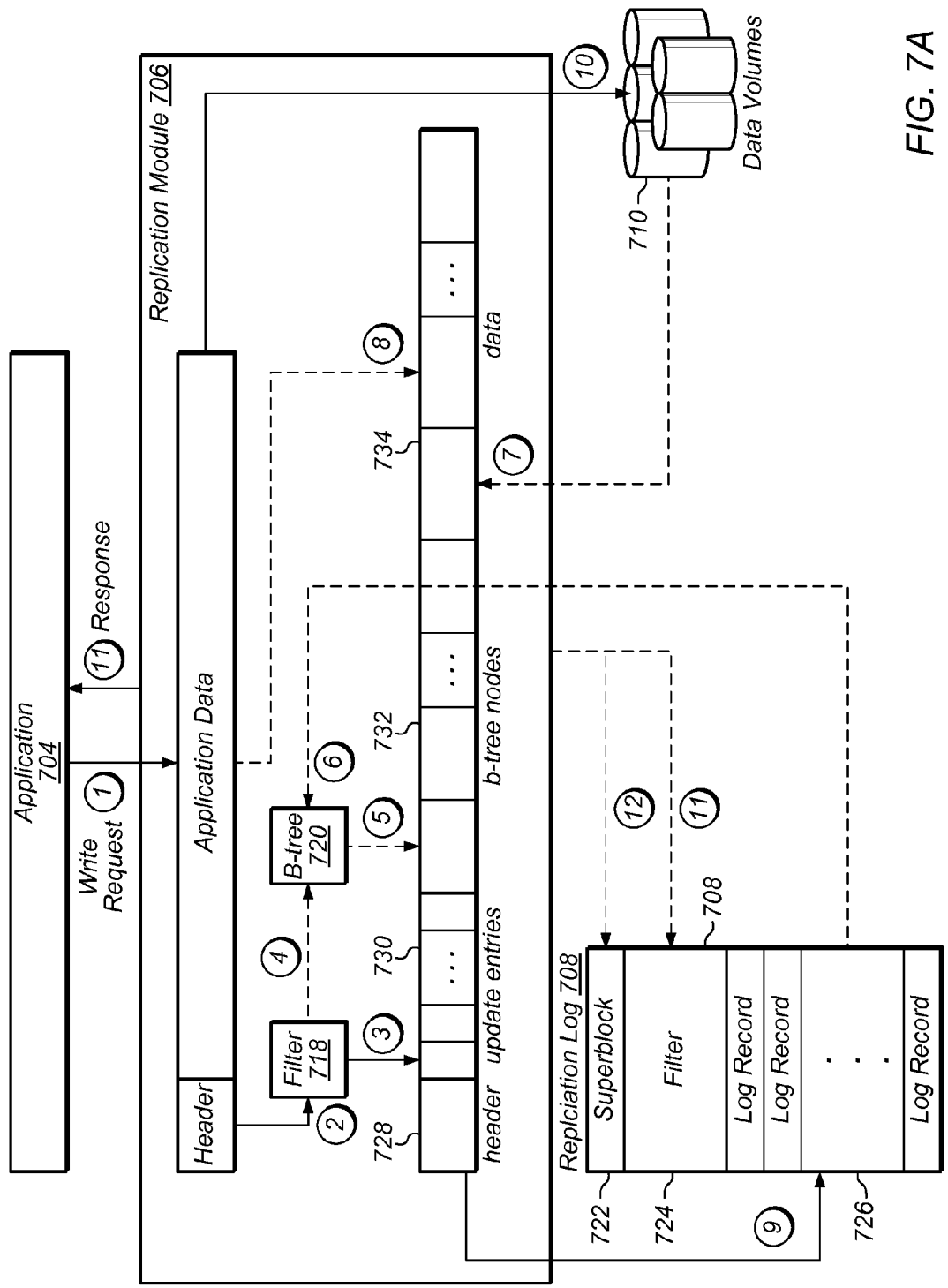
FIGS. 7A-7B are data flow architecture diagrams for a method for logging and asynchronously replicating changes to a volume group.
Figure 7B:
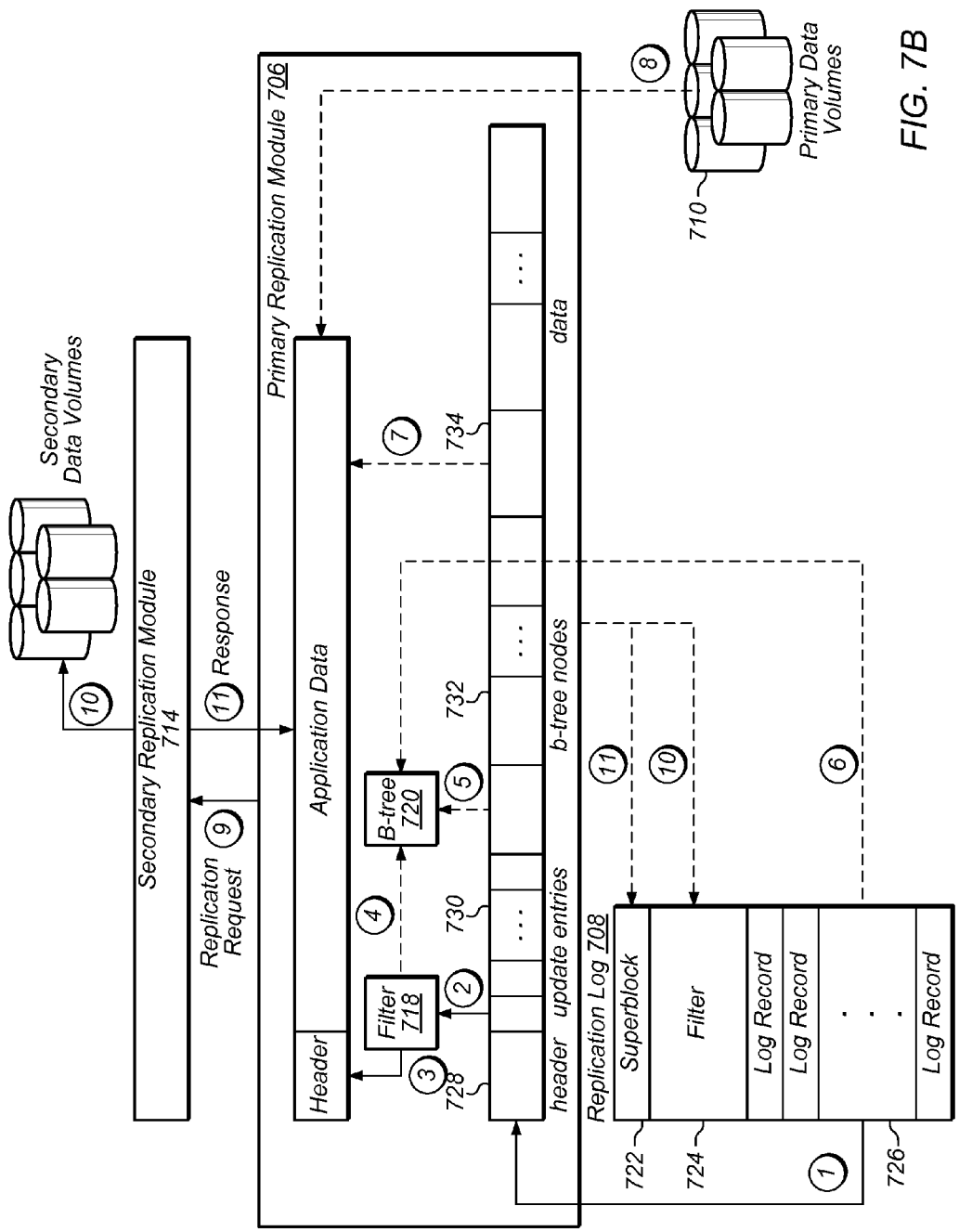

FIGS. 7A-7B—Data Flow Architecture of a Method for Logging and Replicating Changes to a Volume Group FIG. 7A is a diagram illustrating data flow architecture for a method for logging changes to a volume group according to one embodiment. FIG. 7B is a diagram illustrating data flow architecture for a method for asynchronously replicating changes to a volume group according to one embodiment. FIG. 7B may be considered as an extension of the embodiment shown in FIG. 7A, insofar as the method for replicating changes shown in FIG. 7B may be based on the method for logging changes shown in FIG. 7A. It will be noted that FIGS. 7A-7B represent a specific exemplary embodiment, and thus may not represent all possible embodiments. Accordingly, limitations shown in FIGS. 7A-7B and described herein with respect thereto should not be read as limiting to the disclosure as a whole.

As shown in FIG. 7A, the method for logging changes to a volume group may be implemented by a replication module 706 interacting with an application 704, a replication log 708, and data volumes 710. Similarly, as shown in FIG. 7B, the method for asynchronously replicating changes to a volume group may be implemented by the replication module 706 interacting with the replication log 708, the primary data volumes 710, and a secondary replication module 714.

As used herein, a block of a volume will be referred to as "clean" if the current content of the block has been replicated. Otherwise, it will be "dirty". The embodiments of FIGS. 7A-7B may utilize a filter data structure 718, which may be referred to as an "adaptive data change map" ("ADCM") to indicate if a block is clean. The ADCM may be used to make approximate membership queries on a set of block ranges to check if they are possibly dirty. This filter is used to identify if a write operation updates a block range whose current content has not been replicated yet. The filter can report a false positive but never reports a false negative. In other words, if the filter indicates that a block range is clean, it means that it is absolutely clean, but if it returns dirty then the block range may not be dirty.

The method of FIG. 7A may operate to delay data logging for a write operation on a clean block until the block is written again. The first write on a clean block may thus result in a metadata-only log entry in the replication log. This is shown by the solid arrows in the data-flow architecture of FIG. 7A. The motivation for this may be that if the block is replicated before it is overwritten, then the data for this block can be fetched from the data volume, in which case data logging for that block is eliminated. However, a write operation on a dirty block for which the replication log does not include any data log entries thus results in data logging for both before and after content (e.g., the content of the block before and after the write operation). The content before the update (i.e., the delayed log content) is read from the data volume. A b-tree structure 720 is used to track the delayed log entries in order to link a metadata-only log entry to its delayed data log entry. A write operation on a dirty block for which the replication log has a data log entry results in data logging for the new content for this block.

The replication log 708 may include three areas: a superblock 722, a filter (e.g., a copy of the ADCM) 724, and the log records 726. The filter may include two copies (a current and a previous copy) of the filter. The image of the in-memory filter data structure 718 may be regularly persisted in this area. The superblock 722 holds the recent values for the head and tail pointers for the log and points to the current filter.

A log record 726 may include up to four sections: a header 728, update entries 730, b-tree nodes 732, and data 734. The update section 728 is an array of update entries. The b-tree section 732 includes zero or more b-tree nodes. The data section 734 includes zero or more data blocks. The array of update entries are for outstanding write operations to the volume at the time the record is created. In other words, each log record 726 may include update entries for multiple write operations. There may be three types of update entries: metadata-only, copy-on-write, and data. An update entry may include, for an outstanding write operation, some or all of the following fields: the type of the entry, the volume id, a starting offset, and a length. The data for the metadata-only entries is not included in the same log record. The data for copy-on-write and data entries in a log record 726 is included in the data section 734 of the same log record 726. The b-tree section 732 is included only when the update section 730 includes one or more copy-on-write entries.

Each write operation on a clean block range is recorded in the replication log 708 using a metadata-only entry. The data for such an operation is written to the specified data volume in the primary data volumes 710 but not to the replication log 708. The first write operation on a dirty block range is recorded using a copy-on-write entry. For each copy-on-write entry, the data section of the log record includes the content before and after the write (i.e., pre image and post image). In other words, the data for the block range is read from the volume and written to the log record (i.e., a copy-on-write operation) and then the new content for this range from the write operation will be added to the record. Subsequent writes to this range are recorded using the data entry formats and the data is written directly to the replication log until all the records for this range are replicated from the data log, i.e., until the range becomes clean again. This may be required to preserve the write order fidelity and provide continuous crash consistency on the replicated data to the secondary.

The b-tree 720 is used to locate the log records 726 that contain copy-on-write entries for a given block range of a volume. Therefore, the key for the b-tree 720 may be the volume id, and starting offset and length of the data fields. A record may be inserted to the b-tree 720 for each copy-on-write entry. B-tree updates may be done by shadowing; that is, an update to a b-tree leaf node may be done using out-place writes (i.e., copy-on-writes). This means that the parent node pointing to a leaf node, and the parent of the parent node, and so on, should be updated too. Thus, an update operation on a leaf node may require shadowing the leaf node and its ancestors on the path to the root, including the root.

When a b-tree node is updated, it is logged to the b-tree section 732 of the log record 726. The write operation on the volume is initiated after the corresponding replication log update is completed. The write operations on the log and data volume are serialized for a given application write and the write completion is returned to the application 704 only after these writes are done. When applications write one at a time, the logging can increase the overall write latency. However, modern applications generate multiple outstanding updates to achieve higher throughput. This is especially the case when the applications store their data in multiple volumes, each of which can receive updates concurrently. The method of FIG. 7A takes advantage of these multiple outstanding updates by packing multiple log entries into one log write operation to minimize the number of operations on the metadata log (e.g., the metadata portion of the replication log). Thus, it may be advantageous to include multiple update entries 730 and related b-tree nodes 732 and data 734 in a single log record 726.

Asynchronous replication may be performed by using the replication log 708 as shown in FIG. 7B. The primary replication module 706 may start by reading update entries 730 in the log records 726 from the replication log 708. If the current update entry is a metadata-only entry then the replication module 706 determines if the data corresponding to the block range of the update entry is in the data volume, the replication log, or both. The determination is done using the filter 718 and the b-tree 720. If the filter 718 indicates that the block range is dirty and the b-tree 720 has one or more records overlapping with the block range of this metadata-only entry then the data for overlapping parts are read from the replication log's 708 copy-on-write records pointed to by the b-tree records. The data for non-overlapping parts is read from the corresponding volume. In other words, the b-tree 720 is used to make a link between a metadata entry and one or more copy-on-write entries in the replication log 708.

For each copy-on-write entry in a log record 726, there are two entries in the data section, one for the pre-image and the other for the post-image. The asynchronous replication process skips the pre-image data entry when replicating its copy-on-write entry, and instead replicates the post image only. This is because the pre-image will have already been sent to the secondary replication module 714 when its metadata-only entry was processed previously. If the type of the current update entry is data, then the data for this record is fetched from the data section of the record.

As described above, the filter 718 may be an adaptive data change map (ADCM). As noted in previous sections, data change map data structures may be implemented in any of a variety of ways; the following is a discussion of filters specifically in relation to the embodiments of FIGS. 7A-7B, including implementation details of one possible filter for the embodiments of FIGS. 7A-7B. Accordingly, similar to the above description with respect to FIGS. 7A-7B, while part or all of the below discussion may be relevant to other parts of the disclosure, limitations described in the discussion below should not be read as limiting to the disclosure as a whole.

There are several features that would be desirable in a filter structure for the embodiments of FIGS. 7A-7B.

It is desirable that the filter be flexible for insertion and removal of elements. This is important because block ranges will be inserted to the filter while the data volume is being updated and removed from the filter when they are replicated.

The size of the filter should be linear with the number of elements in the set, rather than the maximum size of the set. The filter will be persisted on disk (i.e., in the replication log) regularly; persisting only the updated part of the structure rather than the whole structure would be more efficient in terms of flushing the filter to disk and reading it back from disk.

The filter structure should adapt to the statistical distribution of members so that it can be compressed by representing a group of neighboring elements (in their key space) instead of individual elements. A sequential stream of updates to the data volume should be represented with a single element that identifies the resulting range of updated blocks rather than individual updates. This will lead to a very compact data structure when the blocks can be grouped in such a way.

One filter that could be considered is a bloom filter. Bloom filters are space-efficient probabilistic in-memory data structures that are used to test if an element is a member of a set. A bloom filter is an array of buckets where an element is mapped to k buckets by using k different hash functions. Each bucket is a bit in the original bloom filter. Initially, all the bits are set to zero. When an element is added to the set, the corresponding k bits are set to 1. Testing if an element is a member of a set is done by checking if all the corresponding k bits are set to 1. This bloom filter supports insertions but not removals. A variant of the bloom filter, called a counting bloom filter, uses multiple bits per bucket to support removals. This means that each bucket becomes a running counter. However, arithmetic overflows are still possible. The size of a bloom filter is required to be linear with the maximum size of the set in order to be an efficient filter. The bloom filters are mostly static structures such that their size has to be known in advance. The mapping between the members and the buckets is completely random; this means that the structure for a bloom filter cannot be compressed. Thus, while a bloom filter may be used if desired, other solutions may be more desirable in some embodiments.

One alternative to using a bloom filter, involves using a balanced tree and a heap data structure of balanced tree nodes. An ADCM constructed in the way described below may fulfill all of the desired features for a filter as described above. It starts as an exact data change map (e.g., exact representation of the on-disk metadata) and stays exact until the number of changes accumulated in the log reaches a static or dynamically calculated limit, or no more memory can be dynamically allocated when the data change rate exceeds replication rate. Then it becomes an approximate map by compacting the in-memory structure to limit its memory footprint. This is achieved by maintaining in-memory records for groups of changed areas instead of a separate record for each. This grouping results in treating unchanged areas as changed and therefore may lead to unnecessary data logging activities. However, this does not impact the amount of replicated data to the secondary site, as the replication is driven using the on-disk structure which accurately records only changed blocks.

The balanced tree may be used to search the metadata records to detect overlapping updates. A tree node represents a range of blocks that have been updated but not yet replicated. Thus, it holds the starting block address and length of that block range, and a reference count which is equal to the number of metadata log records overlapping this range. When the reference count of a node becomes zero (which means that the block range of this node has been replicated), the node is removed from the tree. The tree is sorted by the starting block offset. The tree does not contain overlapping block ranges. When a new block range overlaps with one or more tree nodes, the overlapping nodes are removed from the balanced tree and the heap, and a new node is inserted to the tree and heap. The block range of this node covers the block ranges of the removed nodes as well as the new block range. The reference count for a newly inserted node is set to the sum of the reference counts on the removed nodes plus one.

When no more nodes can be added to the tree because the number of nodes in the tree has reached a configured or dynamically calculated threshold, or no more nodes can be allocated due to insufficient memory, the ADCM becomes full. When the ADCM is full, either the new range to be inserted to the tree is merged with an existing node, or two existing neighbor nodes need to be merged to create room for the new node. Such merge operations may mark unchanged blocks as changed, in the in-memory filter data structure. A block range for a write operation is recorded on-disk (e.g., in the replication log) as it is, independent of the in-memory (e.g., filter) operations. Thus the balanced tree will represent an approximation of changed blocks recorded on disk. To maintain a good approximation, the tree should be searched to find a pair of updated block ranges (e.g., a pair of nodes) which are separated by a smallest number of blocks; that is, the closed pair of nodes. The closest pair in a one dimensional sorted list can be found in O(n), where n is the number of list entries, by scanning the list. Scanning the whole tree for every insertion may not be acceptable. Thus, the heap data structure may be used to find the closest pair of nodes in O(1), e.g., without scanning the balanced tree.

A pair of tree nodes is considered "neighboring" if there are not other nodes whose offset is between the offsets of this pair of nodes. In other words, a pair of adjacent nodes in a list of nodes sorted by their offset are called neighboring nodes. Since the block ranges do not overlap in the balanced tree, the distance between neighboring nodes can be expressed simply as the number of blocks between them. As an example, let x and y be two neighboring nodes such that x.offset<y.offset. The distance between the nodes may then be defined as y.offset−(x.offset+x.length). The key field for the heap data structure is the distance between neighboring nodes and the data field is the balanced tree node. The distance value for the node with the highest offset is defined to be infinite. The heap property for the heap data structure is the min heap property; that is, the parent node in the heap is always smaller than its children. This will be sufficient to satisfy that the first member of the closest pair of nodes will always be at the root (e.g., will always be the first element) of the heap data structure. The other node of the pair can be located in the tree by visiting the node next to the node pointed to by the root of the heap, since the balanced tree is sorted by offset addresses.

When a node is inserted into the balanced tree or removed therefrom, a corresponding node is inserted into or removed from the heap. Adding or removing a balanced tree node may also require updating the distance field of the neighboring node with the smaller offset. Such a neighboring node may always exist except when the added or removed node is the node with the smallest offset. This update to the neighboring node can be done easily by removing it from the heap and reinserting it with the new distance value.

When a block range becomes clean, e.g., when its content is replicated, it may be removed from the ADCM and b-tree. However, its removal from the b-tree may be delayed until the b-tree node for this block is updated due to an insertion. This delayed update requires that each time a b-tree node is updated, its entries are checked if they are clean using the ADCM. If they are clean then they are removed from the b-tree node. This means that removals from the b-tree do not require additional updates on the replication log.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

We claim:

1. A non-transitory computer-readable storage medium comprising program instructions for replicating data, wherein the program instructions are executable to:
   receive a write request to write data to a location in a volume;
   store metadata associated with the write request;
   maintain information indicating locations of earlier write requests to the volume that have not yet been replicated to a secondary storage;
   determine if the write request overlaps with one or more locations indicated by the information indicating locations of earlier write requests to the volume that have not yet been replicated to the secondary storage;
   store the data in a replication log in response to determining that the write request overlaps with one or more locations indicated by the information indicating locations of earlier write requests to the volume;
   wherein the data is not stored in the replication log in response to determining that the write request does not overlap with one or more locations indicated by the information indicating locations of earlier write requests to the volume;
   write the data to the location in the volume in response to the write request; and
   periodically replicate changes to the volume to the secondary storage using the replication log.

2. The computer-readable storage medium of claim 1, wherein the program instructions executable to determine if the write request overlaps with one or more locations indicated by the information indicating locations of earlier write requests to the volume that have not yet been replicated to the secondary storage are further executable to:
   determine if the write request is a first write request that overlaps on a block range of one or more earlier write requests to the volume and that the one or more earlier write requests have not yet been replicated to the secondary storage;
   wherein in response to determining that the write request is the first write request that overlaps on the block range, the program instructions are further executable to store data from the volume corresponding to the block range to the replication log.

3. The computer-readable storage medium of claim 2, wherein the program instructions are further executable to:
   store linking information, wherein the linking information links an entry in the replication log comprising the data from the volume corresponding to the block range and one or more entries in the replication log corresponding to one or more overlapping earlier write requests.

4. The computer-readable storage medium of claim 1, wherein the program instructions are further executable to:
   maintain a data change map data structure in memory, wherein the information indicating locations of earlier write requests to the volume that have not yet been replicated to a secondary storage comprises the data change map data structure;
   wherein the program instructions are executable to examine the data change map data structure to determine if the write request overlaps with one or more locations indicated by the information indicating locations of earlier write requests to the volume that have not yet been replicated to the secondary storage.

5. The computer-readable storage medium of claim 4, wherein the data change map data structure comprises a plurality of entries, wherein the plurality of entries track locations of changes to the volume that have not yet been replicated to a secondary storage;
   wherein the program instructions for maintaining the data change map data structure in memory are executable to merge entries in the data change map data structure if a number of entries in the data change map data structure reaches a limit.

6. The computer-readable storage medium of claim 1, wherein, in periodically replicating changes to the volume to the secondary storage using the replication log, the program instructions are executable to:
   read a first record from the replication log, wherein the first record refers to a first area of the volume;

determine if at least a portion of the first area of the volume has been overwritten;

if at least a portion of the first area of the volume has not been overwritten, then read first data from the portion of the first area of the volume that has not been overwritten and provide the first data to the secondary storage;

if at least a portion of the first area of the volume has been overwritten, then read second data corresponding to the overwritten portion of the first area of the volume from the replication log and provide the second data to the secondary storage.

7. The computer-readable storage medium of claim 6, wherein, in determining if at least a portion of the first area of the volume has been overwritten, the program instructions are executable to:

utilize information in one or more data structures to determine if at least a portion of the first area of the volume has possibly been overwritten and to determine one or more portions of the replication log that comprise the second data.

8. A computer-implemented method for replicating data, the method comprising:

a computer system receiving a write request to write data to a location in a volume;

the computer system storing metadata associated with the write request;

the computer system maintaining information indicating locations of earlier write requests to the volume that have not yet been replicated to a secondary storage;

the computer system determining if the write request overlaps with one or more locations indicated by the information indicating locations of earlier write requests to the volume that have not yet been replicated to the secondary storage;

the computer system storing the data in a replication log in response to determining that the write request possibly overlaps with one or more locations indicated by the information indicating locations of earlier write requests to the volume;

wherein the data is not stored in the replication log in response to determining that the write request does not overlap with one or more locations indicated by the information indicating locations of earlier write requests to the volume;

the computer system writing the data to the location in the volume in response to the write request; and the computer system periodically replicating changes to the volume to the secondary storage using the replication log.

9. The computer-implemented method of claim 8, wherein said determining comprises determining if the write request is a first write request that overlaps on a block range of one or more earlier write requests to the volume and that the one or more earlier write requests have not yet been replicated to the secondary storage;

wherein in response to determining that the write request is the first write request that overlaps on the block range, the method further comprises the computer system storing data from the volume corresponding to the block range to the replication log.

10. The computer-implemented method of claim 9, further comprising:

the computer system storing linking information, wherein the linking information links an entry in the replication log comprising the data from the volume corresponding to the block range and one or more entries in the replication log corresponding to one or more overlapping earlier write requests.

11. The computer-implemented method of claim 8, further comprising:

the computer system maintaining a data change map data structure in memory, wherein the information indicating locations of earlier write requests to the volume that have not yet been replicated to a secondary storage comprises the data change map data structure;

wherein determining if the write request overlaps with one or more locations indicated by the information indicating locations of earlier write requests to the volume that have not yet been replicated to the secondary storage comprises examining the data change map data structure.

12. The computer-implemented method of claim 11, wherein the data change map data structure comprises a plurality of entries, wherein the plurality of entries track locations of changes to the volume that have not yet been replicated to a secondary storage;

wherein maintaining the data change map data structure in memory comprises merging entries in the data change map data structure if a number of entries in the data change map data structure reaches a limit.

13. The computer-implemented method of claim 8, wherein periodically replicating changes to the volume to the secondary storage using the replication log further comprises:

the computer system reading a first record from the replication log, wherein the first record refers to a first area of the volume;

the computer system determining if at least a portion of the first area of the volume has been overwritten;

if at least a portion of the first area of the volume has not been overwritten, the computer system reading first data from the portion of the first area of the volume that has not been overwritten and providing the first data to the secondary storage;

if at least a portion of the first area of the volume has been overwritten, the computer system reading second data corresponding to the overwritten portion of the first area of the volume from the replication log and providing the second data to the secondary storage.

14. The computer-implemented method of claim 13, wherein determining if at least a portion of the first area of the volume has been overwritten further comprises:

utilizing information in one or more data structures to determine if at least a portion of the first area of the volume has possibly been overwritten and to determine one or more portions of the replication log that comprise the second data.

15. A system for replicating data, the system comprising:

one or more processors;

a non-transitory computer-readable storage medium comprising program instructions executable by the one or more processors, wherein the program instructions are executable to:

receive a write request to write data to a location in a volume;

store metadata associated with the write request;

maintain information indicating locations of earlier write requests to the volume that have not yet been replicated to a secondary storage;

determine if the write request overlaps with one or more locations indicated by the information indicating locations of earlier write requests to the volume that have not yet been replicated to the secondary storage;

store the data in a replication log in response to determining that the write request overlaps with one or more locations indicated by the information indicating locations of earlier write requests to the volume;

wherein the data is not stored in the replication log in response to determining that the write request does not overlap with one or more locations indicated by the information indicating locations of earlier write requests to the volume;

write the data to the location in the volume in response to the write request; and periodically replicate changes to the volume to the secondary storage using the replication log.

16. The system of claim 15, wherein the program instructions executable to determine if the write request overlaps with one or more locations indicated by the information indicating locations of earlier write requests to the volume that have not yet been replicated to the secondary storage are further executable to:

determine if the write request is a first write request that overlaps on a block range of one or more earlier write requests to the volume and that the one or more earlier write requests have not yet been replicated to the secondary storage;

wherein in response to determining that the write request is the first write request that overlaps on the block range, the program instructions are further executable to store data from the volume corresponding to the block range to the replication log.

17. The system of claim 16, wherein the program instructions are further executable to:

store linking information, wherein the linking information links an entry in the replication log comprising the data from the volume corresponding to the block range and one or more entries in the replication log corresponding to one or more overlapping earlier write requests.

18. The system of claim 15, wherein the program instructions are further executable to:

maintain a data change map data structure in memory, wherein the information indicating locations of earlier write requests to the volume that have not yet been replicated to a secondary storage comprises the data change map data structure;

wherein the program instructions are executable to examine the data change map data structure to determine if the write request overlaps with one or more locations indicated by the information indicating locations of earlier write requests to the volume that have not yet been replicated to the secondary storage.

19. The system of claim 15, wherein, in periodically replicating changes to the volume to the secondary storage using the replication log, the program instructions are executable to:

read a first record from the replication log, wherein the first record refers to a first area of the volume;

determine if at least a portion of the first area of the volume has been overwritten;

if at least a portion of the first area of the volume has not been overwritten, then read first data from the portion of the first area of the volume that has not been overwritten and provide the first data to the secondary storage;

if at least a portion of the first area of the volume has been overwritten, then read second data corresponding to the overwritten portion of the first area of the volume from the replication log and provide the second data to the secondary storage.

20. The system of claim 19, wherein, in determining if at least a portion of the first area of the volume has been overwritten, the program instructions are executable to:

utilize information in one or more data structures to determine if at least a portion of the first area of the volume has possibly been overwritten and to determine one or more portions of the replication log that comprise the second data.

* * * * *